(12) United States Patent
Shih

(10) Patent No.: US 9,242,881 B2
(45) Date of Patent: Jan. 26, 2016

(54) SECONDARY SOLID-PHASE ANAEROBIC DIGESTION PRODUCING MORE BIOGAS

(71) Applicant: Jason Chia Hsing Shih, Cary, NC (US)

(72) Inventor: Jason Chia Hsing Shih, Cary, NC (US)

(73) Assignee: Jason Chia Hsing Shih, Cary, NC (US)

( * ) Notice: Subject to any disclaimer, the term of this patent is extended or adjusted under 35 U.S.C. 154(b) by 172 days.

(21) Appl. No.: 13/793,343

(22) Filed: Mar. 11, 2013

(65) Prior Publication Data

US 2014/0251899 A1   Sep. 11, 2014

(51) Int. Cl.
 *C02F 3/28* (2006.01)
 *C05F 17/00* (2006.01)

(52) U.S. Cl.
 CPC .............. *C02F 3/28* (2013.01); *C05F 17/0027* (2013.01); *C02F 2301/106* (2013.01); *Y02E 50/343* (2013.01); *Y02W 10/12* (2015.05)

(58) Field of Classification Search
 CPC ... C02F 3/28; C02F 2301/106; Y02E 50/343; C05F 17/0027; Y02W 10/12
 USPC .......................................... 210/603, 612, 613
 See application file for complete search history.

(56) References Cited

U.S. PATENT DOCUMENTS

| | | | | |
|---|---|---|---|---|
| 4,246,099 A * | 1/1981 | Gould et al. | ................... | 210/603 |
| 4,276,174 A * | 6/1981 | Breider et al. | ................. | 210/613 |
| 4,372,856 A * | 2/1983 | Morrison | ................... | C02F 3/28 |
| | | | | 126/572 |
| 4,750,454 A * | 6/1988 | Santina et al. | ..................... | 123/3 |
| 2005/0260744 A1* | 11/2005 | Campbell | .................. | 435/290.2 |
| 2009/0305379 A1* | 12/2009 | Johnson et al. | ............... | 435/170 |
| 2010/0201026 A1* | 8/2010 | Dvorak et al. | ................. | 264/241 |

FOREIGN PATENT DOCUMENTS

| | | |
|---|---|---|
| CZ | 300046 B6 | 4/2008 |
| GB | 2480318 A | 11/2011 |
| JP | 4-190900 | 7/1992 |

* cited by examiner

*Primary Examiner* — Fred Prince
(74) *Attorney, Agent, or Firm* — James G. Passé; Passé Intellectual Property, LLC

(57) ABSTRACT

The present invention relates to a method for taking liquid anaerobic digestion effluent and increasing the solids content by using the effluent and biomass to further digest both.

7 Claims, 4 Drawing Sheets

SECONDARY SOLID-PHASE ANAEROBIC DIGESTION PRODUCING MORE BIOGAS

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method for handling anaerobic digestion effluent. In particular, it relates to a method for treating the effluent in a high solids digestion to produce a biogas and a semi-solid secondary digestate.

2. Description of Related Art

The anaerobic digestion of organic material such as sewage sludge, municipal waste, industrial waste forest waste, agricultural waste, and especially animal waste is the fermentation of such material by bacteria in the absence of oxygen. The benefit of such digestion of waste material includes the stabilization of waste, odor control, solid reduction, energy production in the form of methane gas, elimination or reduction of pathogens, making the waste more environmentally neutral, producing a nutrient source, and the like. It has been generally used in many large scale treatments of animal wastes to control the disposal problem associated with such waste.

However, after the completion of the anaerobic digestion, the management of the effluent is a challenge. The volume of effluent is typically very large and large tracts of farm land are generally utilized to take the liquid for irrigation and fertilizer. Because of the high Biochemical Oxygen Demand (BOD)/Chemical Oxygen Demand (COD) and ammonium contents of this type of liquid waste, it is not generally allowed to be discharged into natural water streams or other bodies of water. Accordingly, management of the effluent is a constant concern and management problem and has even caused operations to shut down for lack of a management solution.

BRIEF SUMMARY OF THE INVENTION

The present invention relates to the discovery that anaerobic digestion effluent can be transformed into a semi-solid formulation by further fermentation with the addition of biomass to produce a semi-solid mixture which is digested at higher temperature to produce more biogas and a semi-solid which can be used as a fertilizer.

Accordingly, the present invention relates to a method of processing anaerobic digestion effluent comprising:
a) providing a quantity of anaerobic digestion effluent;
b) adding the effluent to a biomass at at least about 50° C. in an insulated tank to form a mixture having a solids concentration of at least 20%;
c) fermenting the mixture in the insulated tank for a time period of from at least about 5 to 10 days; and
d) isolating the wet solids from the liquid.

DETAILED DESCRIPTION OF THE INVENTION

Figure 1:
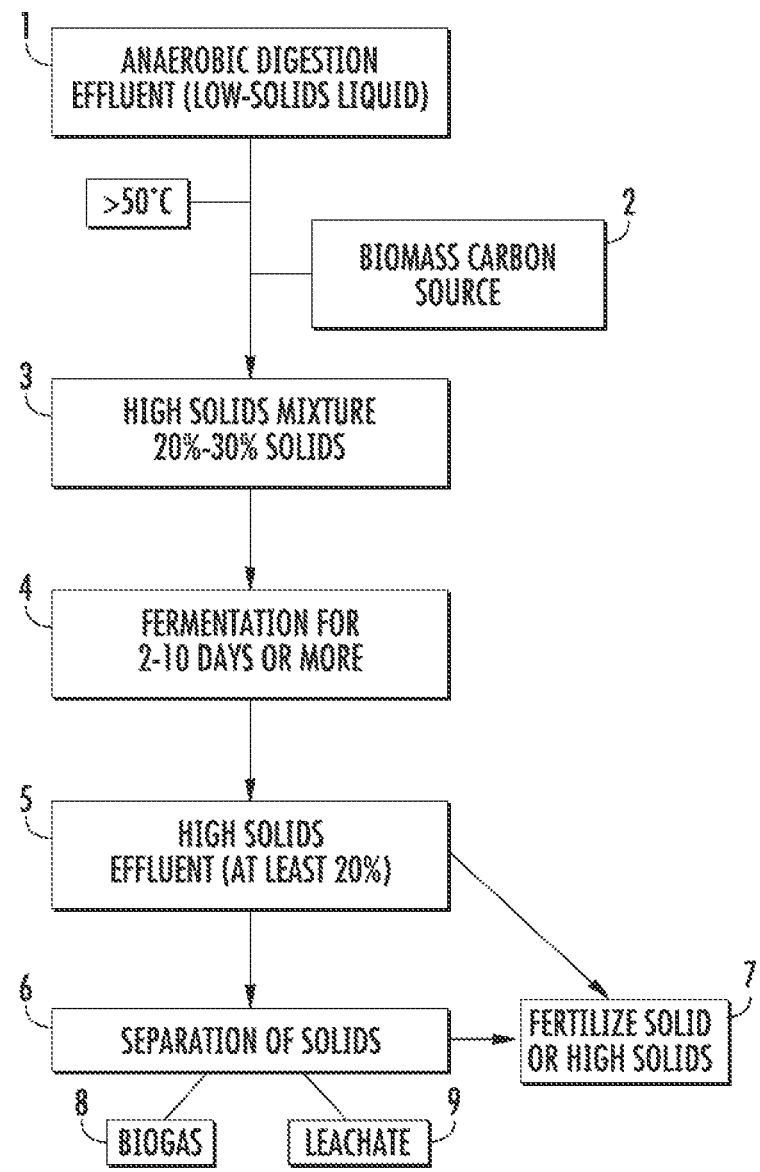
FIG. 1 is flow chart of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein "anaerobic digestion effluent" is a series of processes in which microorganisms break down biodegradable material in the absence of oxygen to produce a low solids liquid effluent. It is used for industrial or domestic purposes to manage waste and/or to release energy. The digestion process begins with bacterial hydrolysis of the input materials to break down insoluble organic polymers, such as carbohydrates, and make them available for other bacteria. Acidogenic bacteria then convert the sugars and amino acids into carbon dioxide, hydrogen, ammonia, and organic acids. Acetogenic bacteria then convert these resulting organic acids into acetic acid, along with additional ammonia, hydrogen, and carbon dioxide. Finally, methanogens convert these products to methane (biogas) and carbon dioxide. The methanogenic archaea populations play an indispensable role in anaerobic wastewater treatments.

It is used as part of the process to treat biodegradable waste and sewage sludge. As part of an integrated waste management system, anaerobic digestion reduces the emission of landfill gas into the atmosphere. Anaerobic digesters can also be fed with purpose-grown energy crops, such as maize.

Anaerobic digestion is widely used as a source of renewable energy. The process produces a biogas, consisting of methane, carbon dioxide and traces of other 'contaminant' gases. This biogas can be used directly as gaseous fuel for heat and power generation or upgraded to natural gas-quality biomethane for transportation fuel. The use of biogas as a fuel helps to replace fossil fuels. Also the nutrient-rich digestate produced can be used as fertilizer. The semi-solid material can be utilized for further or other uses within the skill of the art.

As used herein the term "quantity of anaerobic digestion effluent" refers to a measured quantity of effluent. As long as the quantity of effluent is known, that can be used to determine the conditions for the present invention.

As used herein the term "biomass", refers to biological material from living, or recently living organisms. As an energy source, biomass can either be used directly, or converted into other energy products such as biofuel. Biomass is plant matter used to generate electricity with steam turbines and gasifiers or produce heat, usually by direct combustion. Examples include forest residues (such as dead trees, branches and tree stumps), yard clippings, wood chips, animal waste such as animal manure, and even municipal solid waste. Biomass also includes plant or animal matter that can be converted into fibers or other industrial chemicals, including biofuels. Industrial biomass can be grown from numerous types of plants, including miscanthus, switchgrass, hemp, corn, poplar, willow, sorghum, sugarcane, and a variety of tree species, ranging from eucalyptus to oil palm (palm oil). One embodiment of a hydrolytic degritter is shown herein and also in co-filed application, application no: SHIH001 filed on even date herewith and included herein by reference.

In the practice of the present invention a primary digester effluent of at least about 50° C. is added to biomass to a concentration of at least 20%. In one embodiment, the solids are about 20% to about 30%. The mixture of effluent and biomass is kept in an insulated tank for fermentation. In one embodiment, the temperature of the effluent is preheated to about 30-60° C. The mixture is not further heated and fermented for a period of from about at least 5 days and in one embodiment from about 5 to 10 days.

The mixture is usually carried out in a tank or in two or more tanks in series. As used herein the term "tank" refers to an insulated tank designed for holding the mixture and fermenting at an elevated temperature. The tank can be made of any material such as stainless steel, carbon steel, plastics, or fiber glass and in one embodiment the tank is insulated to better hold the elevated temperature. The tank is optionally fitted on the interior with a mixing apparatus to keep the contents of the tank mixing during the process of the invention. One skilled in the art could choose appropriate mixing apparatus. The type of tank could be also such that the same tank that can be used to complete the anaerobic digestion is used to make the composition of the present invention. This means the mixture never has to be transferred till the process is complete. In other embodiments the slurry can be removed to a different tank for fermentation. Where multiple tanks are utilized, they can be attached in series (see FIG. 4) and rather than waiting for a single tank to drain, the filling and draining can be accomplished in staggered fashion, e.g. five tanks done a day rather than one tank every five days.

The resulting product is very high solids of at least about 20% to about 40% or more. The remaining liquid from the fermentation can further have the liquid separated by leaching or pressing. The high solids material can then be utilized as a fertilizer or as desired.

Now referring to the drawings, FIG. 1 is a flow chart of the method of the invention. A low solids (e.g. 2%-5%) liquid effluent of an anaerobic digestion is measured and isolated 1 (e.g. transferred from an anaerobic digester). A biomass source 2 is then added to the effluent 1 to form a high solids mixture of about 20% to 30% solids 3. The mixture is brought to a temperature of at least about 50 degrees centigrade and held there for a period of about 2 to 10 days or more and allowed to ferment with the naturally occurring organisms present 4 without further heating to then produce a high solids effluent 5. The high solids effluent 5 can be used directly as a fertilizer 7 or the solids can be separated such as by pressing 6 to use as a solid fertilizer 7. Biogas 8 is produced as is a liquid leachate 9 which can be returned for further digestion or discord.

Figure 2:
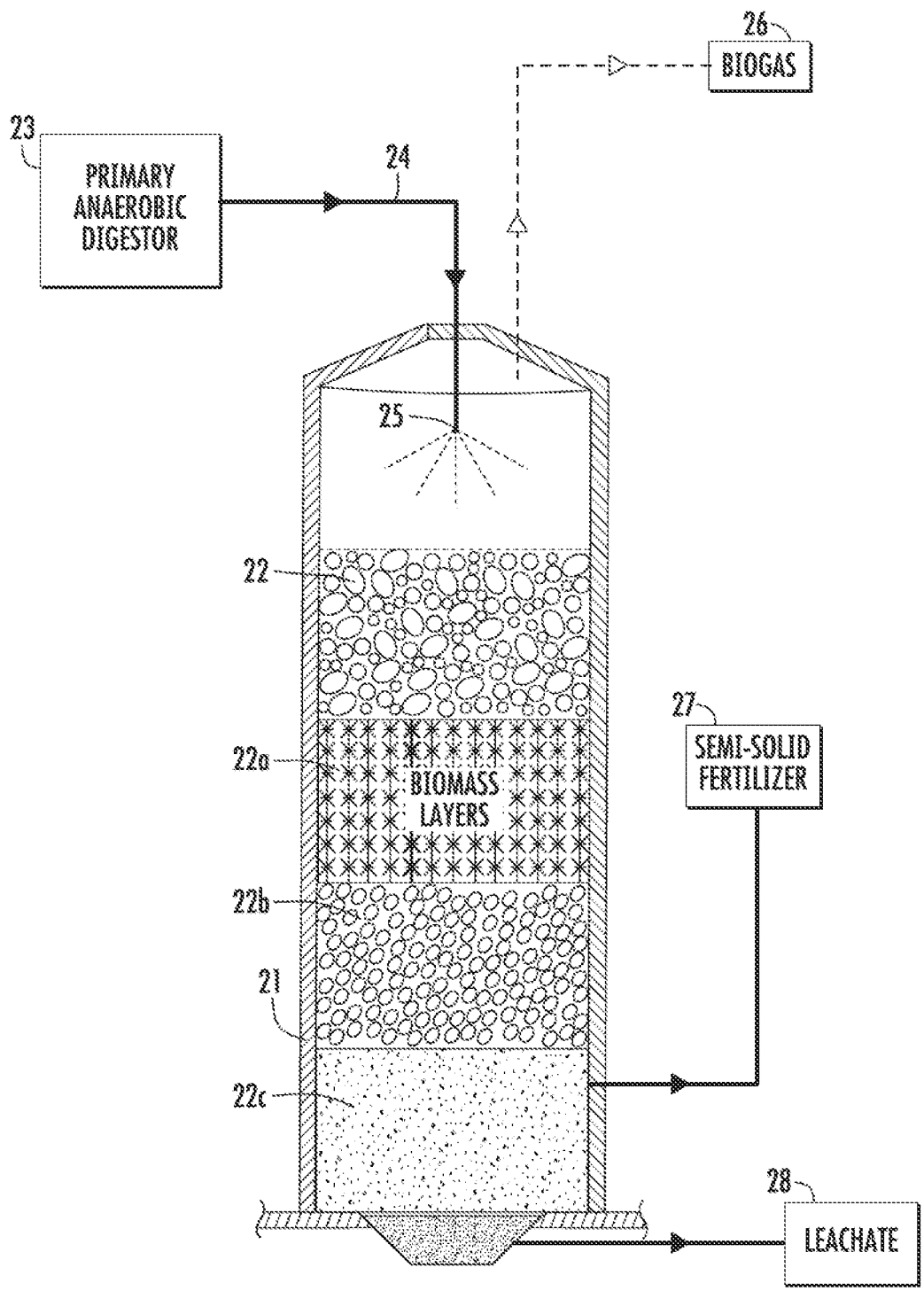
FIG. 2 is a view of the system of the invention.

FIG. 2 is the system of the present invention slurry the actual system used in one embodiment. In this view a solid phase digester, tank 21 is filled with biomass 22. As biomass 22 moves down in tank 21 it becomes further and further digested 22a, 22b, and 22c. While depicted as layers it would likely be a gradient of digested biomass. The primary anaerobic 23 digester delivers effluent 24 to the tank 21 and biomass 22. The effluent is at least about 50 degrees C. when it enters tank 21 via emitter 25. The digestion is about 5-10 days and during the digestion biogas 26 is produced. At the end a semi-solid mass 27 (about 20-40% solid or more) is produced which can be utilized as fertilizer. Any liquid left, if any, is removed as a leachate 28 which can be disposed of or reused in digestion.

Figure 3:
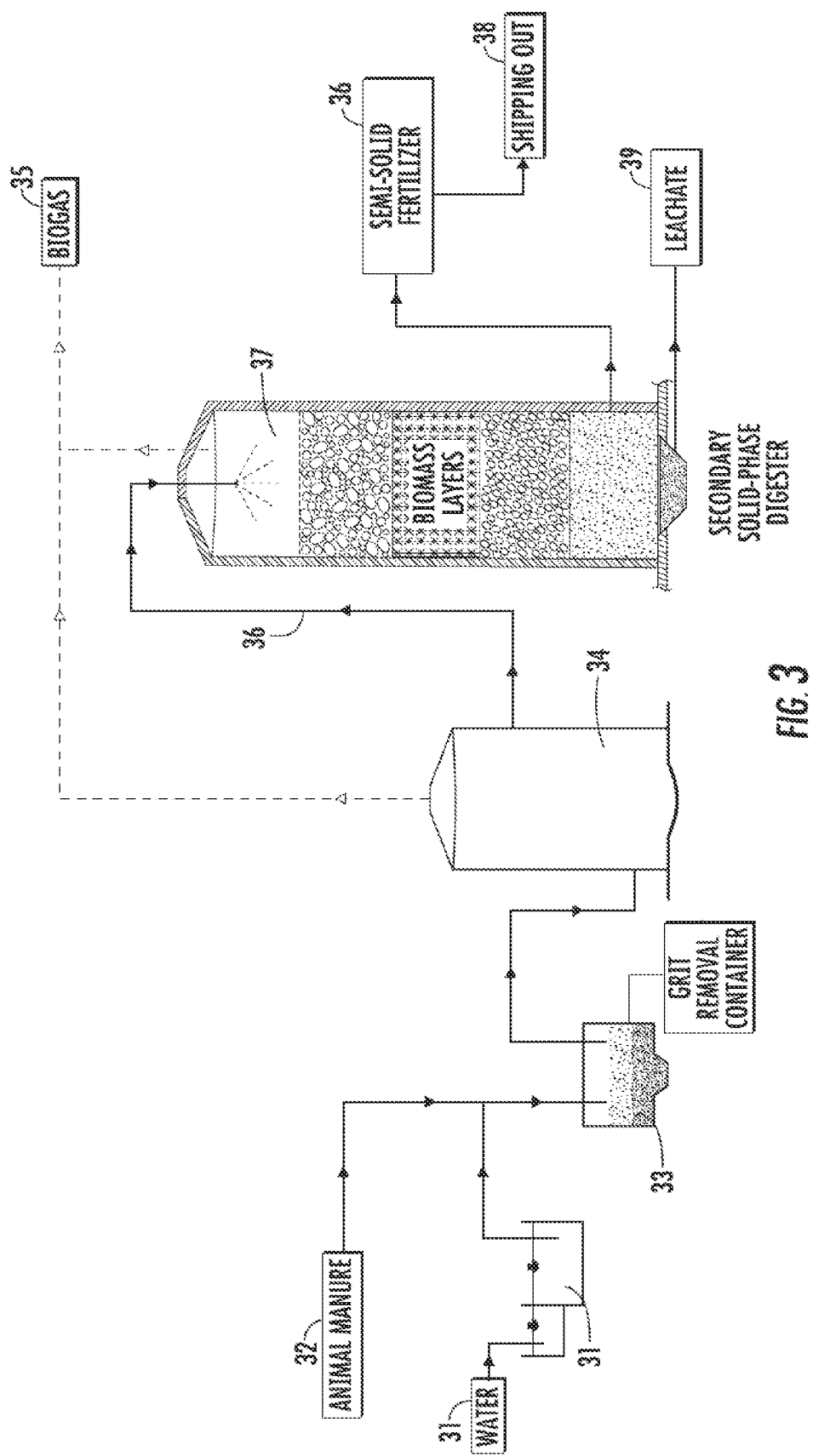
FIG. 3 is an example of the entire biogas production.

In FIG. 3 the solid phase digester is shown in another process. In this embodiment water 31 and animal manure 32 are added to a hydrolytic degritter 33 and degritted. The effluent is added to an anaerobic digester 34. Biogas 35 is removed and a low-solids slurry 36 delivered to the solid phase digester 37 of the present invention. Once again further biogas 35 is pictured as is a semi-solid fertilization 36 and a leachate 39. The fertilizer 36 could then be shipped 38 as desired.

Figure 4:
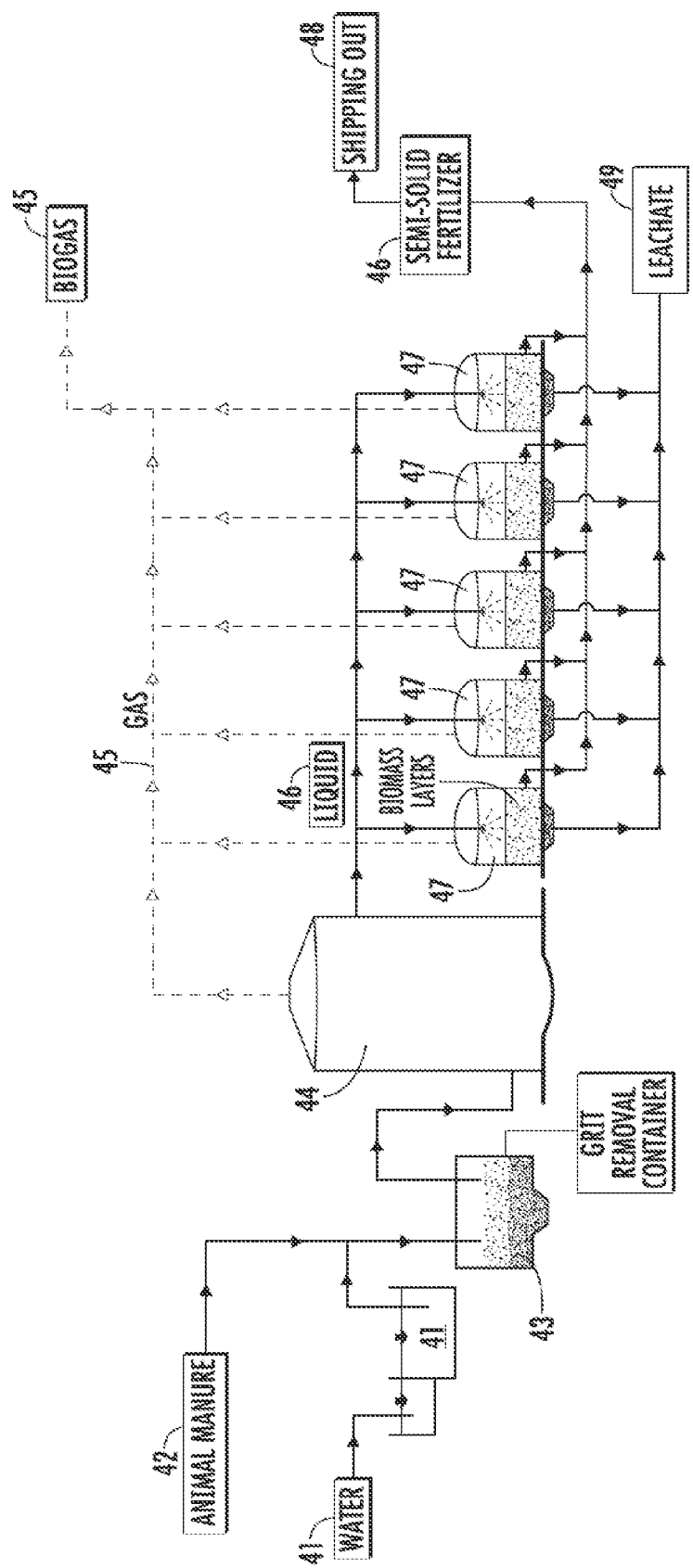
FIG. 4 is an example of a multiple sequential batch method of the present invention for producing biogas.

In FIG. 4 a continuous sequential process method is shown. In this embodiment, water 41 and animal manure 42 are again added to a hydrolytic degritter 43 and the effluent is added to anaerobic digester 44. Biogas 45 is removed and the low solids slurry 46 is delivered to five separate solid phase digesters 47 by filling one each day and draining each after five days. Any number two or greater could be utilized and five as shown by way of example. Semisolid fertilizer 46 is removed as is leachate 49 which could be shipped out 48.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A method of processing an anaerobic digestion effluent having a solids concentration of about 2% to 4% comprising;
    a) providing a quantity of the anaerobic digestion effluent having a solids concentration of about 2% to 4% at a temperature of at least about 50° C.;
    b) adding the effluent to a biomass in a closed insulated tank to form a mixture having a solids concentration of at least about 20%;
    c) fermenting the mixture anaerobically without further heating or stirring in the insulated tank for a time period of from at least about 2 to 10 days; and
    d) isolating wet solids from liquid and biogas in the mixture.

2. The method according to claim 1 wherein biomass is added to the effluent till a concentration of about 20% to about 30% solids is reached.

3. The method according to claim 1 wherein the solids are separated from the liquid by leaching or pressing.

4. The method according to claim 1 wherein the isolated wet solids are used as a fertilizer.

5. The method according to claim 1 wherein the biomass is selected from the group consisting of cellulosic agricultural waste and plant crop material.

6. The method according to claim 1 wherein biogas is isolated from the fermentation mixture.

7. The method according to claim 1 wherein there is a plurality of tanks where the effluent is added to biomass in a single process system.

* * * * *